United States Patent
Andres et al.

[11] Patent Number: 5,094,262
[45] Date of Patent: Mar. 10, 1992

[54] REGULATOR WITH HYSTERESIS-AFFECTED CHARACTERISTIC CURVE

[75] Inventors: Rudolf Andres, Sindelfingen; Michael Dimitrov, Mühlacker; Holger Seel, Aidlingen; Dietmar Zwölfer, Hildrizhausen; Klaus-Jürgen Heimbrodt; Gerold Dierks, both of Treuchtlingen; Klaus Engelhardt, Weissenburg; Dieter Simon, Treuchtlingen, all of Fed. Rep. of Germany

[73] Assignees: Mercedes-Benz AG; Walter Alfmeier GmbH & Co., both of Fed. Rep. of Germany; a part interest

[21] Appl. No.: 705,631

[22] Filed: May 28, 1991

[30] Foreign Application Priority Data

May 25, 1990 [DE] Fed. Rep. of Germany ....... 4016804

[51] Int. Cl.$^5$ .......................... F15B 13/04; G05G 1/00
[52] U.S. Cl. .................. 137/116.5; 267/172; 267/175; 267/177; 297/DIG. 3
[58] Field of Search .............. 74/568 R, 569; 137/116.5; 267/172, 175, 177; 297/284 E, DIG. 3

[56] References Cited

U.S. PATENT DOCUMENTS

| | | | |
|---|---|---|---|
| 2,891,784 | 6/1959 | Taylor | 267/172 |
| 3,482,591 | 12/1969 | Dufresne | 137/116.5 |
| 4,552,402 | 11/1985 | Huber et al. | 297/DIG. 3 X |

FOREIGN PATENT DOCUMENTS 3144247 5/1983 Fed. Rep. of Germany.

Primary Examiner—Gerald A. Michalsky
Attorney, Agent, or Firm—Evenson, Wands, Edwards, Lenahan & McKeown

[57] ABSTRACT

A regulator with a hysteresis-affected characteristic curve has a manually operable actuating element for presetting a desired control variable, an axially displaceable control slide for adjusting the preset control variable and a control incline which is coupled to the actuating element. The control incline converts, by means of a rising control face, the adjustment movement of the actuating element into a axial displacement of the control slide. For the purpose of compensating the hysteresis when adjusting a control a variable such that the same control variable is brought about by rotating the actuating element to the left or to the right into the same setting, the control incline bears a toothing along its control face. Each tooth has, in two planes which extend along the displacement direction of the control face and are perpendicular to one another, a sawtooth-like contour with in each case a rising edge for running up the control slide and a falling edge which follows in the displacement direction. Each tooth contour is associated with one of the two displacement directions. Each tooth contour is associated with one of the two displacement direction of the control incline and deflects the control slide in the axial direction or transversely thereto.

28 Claims, 2 Drawing Sheets

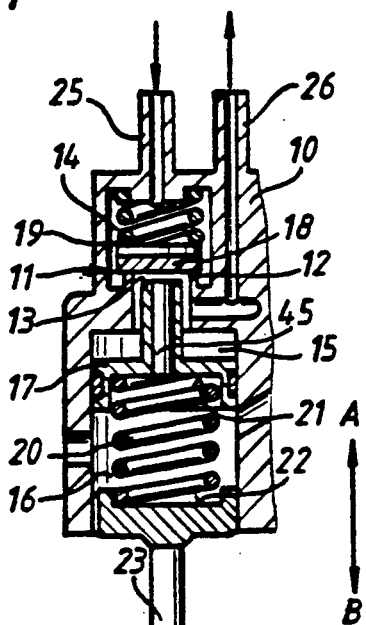
Fig.1
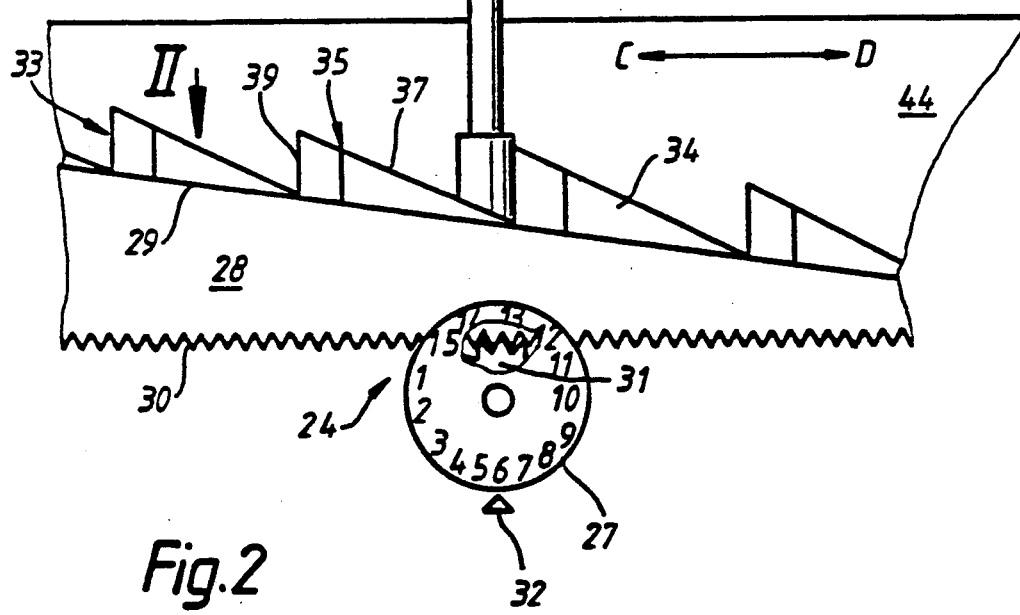
Fig.2
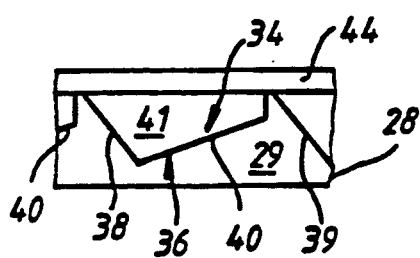

REGULATOR WITH HYSTERESIS-AFFECTED CHARACTERISTIC CURVE

BACKGROUND AND SUMMARY OF THE INVENTION

The invention relates to a regulator and, more specifically to a regulator with a hysteresis-affected characteristic curve having a manually operable actuating element for presetting a desired control variable, an axially displaceable control slide for adjusting the preset control variable in accordance with its axial displacement and a control incline which is coupled to the actuating element and converts its adjustment movement into an axial displacement of the control slide. A control face of the control incline rises in the adjustment direction of the actuating element. The control slide rests in the axial direction with a spring force.

A pneumatic pressure regulator of this kind is disclosed in German Patent Document DE 3,144,247 A1. The manual actuating element is constructed as a manual selection wheel which, when rotated, axially displaces the control slide via the control incline coupled to said manual selection wheel. The control slide itself acts on a control spring constructed as a leaf spring and increases its initial stress with increasing axial displacement. The control spring, for its part, loads an axially displaceable control piston which rests against the valve closing element of a double-seated valve with an inner valve seat of said double-seated valve. When the valve seat is open, a connection exists between a control pressure chamber delimited by the control piston and a pressure-relief chamber which is blocked when the valve seat is closed. The valve closing element rests on a coaxial outer valve seat under the effect of a valve closing spring. The valve seat is arranged in a fixed manner and separates the control pressure chamber from a supply pressure chamber. The valve closing element is loaded in the closing direction by the pressure of a fluid, e.g. air, prevailing in the supply pressure chamber.

On the manual selection wheel there are marks which indicate the respectively set control pressure in the control pressure chamber and thus at the output of the pressure regulator. If the manual selection wheel is rotated to a mark which is numerically higher, the control slide is axially displaced, by means of the displacement of the control incline, towards the control spring, the initial stress of which is thus increased. The more strongly initially stressed control spring lifts off the valve closing element from the outer valve seat by means of the control piston, and a fluid short-circuit exists between the control pressure and high pressure chamber as a result of which the supply pressure increases. The valve closing element does not close the outer valve seat again until the sum of the supply pressure and valve closing spring forces acting on the valve closing element is greater than the difference of the control spring and control pressure forces acting on the control piston. The control pressure is thus set to the desired higher value.

When the manual selection wheel is set to a mark with a lower numerical value, the control incline is rotated in the inverse direction, as a result of which the control slide is displaced in the opposite displacement direction under the effect of the initially stressed control spring. The initial tension of the control spring decreases. The displacement force exerted by the control pressure on the control piston thus becomes greater than the oppositely directed force of the control spring, and the control piston lifts off with its inner valve seat from the valve closing element. As a result of the connection, thus released, to the pressure-relief chamber, the control pressure in the control pressure chamber drops until the force exerted by it on the control piston is smaller than the force of the control spring. The control piston then closes the valve seat and the lower control pressure is set at the output of the pressure regulator.

However, as a result of the hysteresis affecting the pressure regulator, the pressure regulator sets different control pressures with the same numerical setting on the manual selection wheel. This depends on whether the numerical setting is performed by rotating the manual selection wheel to the left or to the right. This can only be avoided if the numerical setting is always rotated from a single direction. If, for example, it is desired to set a higher control pressure, the manual selection wheel is initially set to a very much higher numerical value than the desired one and the desired numerical value is subsequently set. When selecting a lower control pressure, the lower numerical value is set directly. This manipulation is troublesome and not very user-friendly.

The present invention is based on improving a hysteresis-affected regulator of the above-mentioned type in such a way that, irrespective of the adjustment direction of the actuating element, the desired associated control variable is always set in a reproducible manner at the regulator output for all the settings of the actuating element.

This is achieved according to the present invention using a regulator having a hysteresis-affected characteristic curve which includes a manually operable actuating element for presetting a desired control variable, an axially displaceable control slide for adjusting the preset control variable in accordance with said control slide's axial displacement and, a control incline, having a control face, coupled to said actuating element for converting the actuating elements' adjustment movement into an axial displacement of the control slide. The control face rises in the adjustment direction of the actuating element. The control slide, via a spring force, rests in the axial direction. A toothing bears along the control face of the control incline. The toothing includes a multiplicity of equidistantly arranged teeth which have, in each case in two mutually perpendicular planes extending in the displacement direction of the control incline, a sawtooth-like contour in each case with one rising edge for running up the control slide and a falling edge which follows in the displacement direction, the rising edge of the one tooth contour falling away in the one displacement direction of the control incline and the rising edge of the other tooth contour falling away in the other displacement direction inversely to the latter rising edge of the control incline. The falling direction of the rising edge of the tooth contour, in the plane perpendicular to the control face of the control incline, coincides with the falling direction of the control face.

In the regulator according to the present invention, the control slide is initially displaced axially over-proportionally or super-proportionally by means of the specially formed toothing provided on the control face of the control incline. This occurs when the control incline is displaced in the direction of greater control variable setting, in order to subsequently cancel out the axial displacement again except for the required amount. Thus, in the hysteresis-affected characteristic curve of the regulator illustrated in FIG. 4, the characteristic curve is run through, for example, from point a to b via c to d in order to finally reach the desired final setting at e. The actuating element was adjusted in one direction, for example to the right from the position $S_1$ to $S_2$. On the other hand, when the control incline is displaced for the purpose of setting a smaller control variable, a proportional displacement of the control slide predetermined by the control face of the control incline occurs. The characteristic curve of which runs through according to FIG. 4 from point e to point a if, for example, the actuating element is reset from the setting $S_2$ back to the setting $S_1$, for example to the left.

This described process is unavoidably carried out in each case by the toothing depending on whether the actuating element is adjusted in one direction or the other and thus the control incline is displaced in one direction or oppositely in the other direction. When adjusting in the direction of a larger control variable, the control slide slides along the one tooth contour which lies in the plane extending in the displacement direction of the control incline at right angles to the control face. The over-proportional axial displacement of the control slide is effected when sliding along the rising edge and the partial reversal of this axial displacement of the control slide is effected when sliding along the falling edge. At the foot of the falling edge, the control slide assumes a kind of locking position from which it is pushed out again the next time the actuating element is actuated. When adjusting in the direction of a smaller control variable, the control slide slides along the control face and is laterally deflected by the other tooth contour so that it can bypass the tooth in order to assume a final position. The final position is again at the foot of the tooth where the falling edge of the one tooth contour and the rising edge of the other tooth contour come together. The setting of the control variable thus occurs in strictly predetermined intervals and not without increments. This is not detrimental to user-friendliness of the device.

The regulator according to the present invention can be used in many fields. For example, the regulator can be used as a fluid pressure regulator for seat contour adjustment in the case of orthopaedic vehicle upholstered seats or as an electrical potentiometer for compensating the hysteresis in the adjustment path of the potentiometer slide.

Advantageous embodiments of the regulator according to the invention with expedient further developments and embodiments of the invention are further described below.

According to a preferred embodiment of the invention, if the area of the control face of the control incline which extends along the rising edge of the tooth contour in the plane parallel to the control face is of a planar construction, in a deviation from the oblique course of the control face, it is ensured, by virtue of the spring force with which it is pressed on the control face, that the control slide is always automatically returned into one of the end positions between the teeth.

Other objects, advantages and novel features of the present invention will become apparent from the following detailed description of the invention when considered in conjunction with the accompanying drawings.

BRIEF DESCRIPTION OF THE DRAWINGS

FIG. 1 is a diagram of a pneumatic pressure controller for the seat contour adjustment of an orthopaedic vehicle upholstered seat, illustrated partially in longitudinal section and partially in a developed view;

FIG. 2 is a top view of a tooth of a toothing in the pressure regulator according to FIG. 1;

DETAILED DESCRIPTION OF THE DRAWINGS

Figure 3:
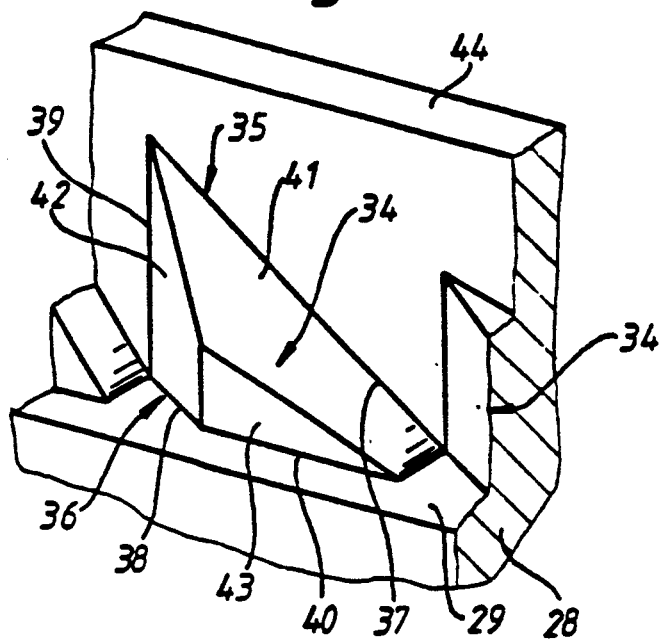
FIG. 3 is a perspective view of a tooth of the toothing in the pressure regulator according to FIG. 1.

The pressure regulator is illustrated only diagrammatically in FIG. 1 and only to the extent which is necessary for an understanding of the present invention. An exact constructional design of such a pressure regulator for seat contour adjustment of orthopaedic vehicle seats is described in German Patent Documents DE 3,144,247 Al or DE 3,902,137 Al. The pressure regulator has a housing 10 which includes a double-seated valve 11 with an outer valve seat 12 and an inner valve seat 13 coaxial thereto. The spatially arranged fixed valve seat 12 divides a supply pressure chamber 14 from a control pressure chamber 15 while the inner valve seat 13, arranged on the end side of a control piston 17, is situated between the control pressure chamber 15 and a pressure-relief chamber 16 which communicates with the surrounding atmosphere. Both seats 12, 13 cooperate with a valve closing element 18 which is arranged in the supply pressure chamber 14 and is loaded by a valve closing spring 19 in the closing direction of the valve seat 12. The closing force with which the valve closing element 18 rests on the outer valve seat 12 is determined by the spring force of the valve closing spring 19 and the supply pressure acting on the valve closing element 18. The control piston 17 which is arranged axially displaceable in the housing 10 and which has an approximate T-section separates, with its transverse part of the larger diameter, the control pressure chamber 15 from the pressure-relief chamber 16 and bears, on the end side of the center part which is of smaller diameter, the inner valve seat 13 which comes to rest on the valve closing element 18 in the closed setting of the double-seated valve 11. The inner valve seat 13 encloses the mouth of a pressure-relief bore 45 which leads through the control piston 17 and into the pressure-relief chamber 16. The control piston 17 is loaded in the opening direction by the control pressure in the control pressure chamber 15 and in the closing direction by a control spring 20 constructed as a screw pressure spring. For this purpose, the control piston 17 bears a support 21 for the control spring 20 while the other support 22 is made on a control slide 23 which engages at the end side with a setting mechanism. The supply pressure chamber 14 is connected via a housing connection 25 to a compressed air source and the control pressure chamber 15 is connected via a second housing connection 26 to the orthopaedic vehicle seat, the seating contour of which can be individually adjusted in accordance with the control pressure set in the control pressure chamber 15.

A manual selection wheel 27, which serves for the desired preselection of the control pressure, is coupled to a control incline 28 in such a way that a rotation of the manual selection wheel 27 always results in an equally large displacement of the control incline 28. By means of different rotary directions of the manual selection wheel 27, different displacement directions of the control incline 28 are triggered. The control incline 28 is illustrated here in a developed view. It must be understood that the control incline is a ring whose annular end face facing the control slide 23 forms a control face 29 rising in the circumferential direction. On the opposite side of the control face 29, the control incline 28 bears a toothed gear 30 which intermeshes with a pinion 31 which is fixedly arranged on the shaft of the manual selection wheel 27. This coupling of manual selection wheel 27 and control incline 28 is only by way of example and can be implemented differently, for example, as described in the two afore-mentioned German Patent Documents. In this case, there is a rigid coupling between manual selection wheel 27 and control ramp 28 such that the adjustment of the one in either direction always results in the same adjustment of the other in the corresponding adjustment directions.

The manual selection wheel 27 bears a series of numbers which serve as an aid for remembering the control pressure set by the pressure regulator. The assignment occurs by means of a fixed mark 32. The numbers are arranged such that a rotation of the manual selection wheel 27 in the direction of larger numerical values results in a higher control pressure at the output of the pressure regulator and in the direction of smaller numerical values results in a reduced control pressure. The control slide 23 is placed with its free end against the control face 29 of the control incline 28 by the spring force of the control spring 20 so that, in accordance with the setting of the control incline 28, the control slide 23 is displaced to a greater or lesser extent in the direction of the control piston 17 and thus the initial tension of the control spring 20 is greater or smaller. The initial tension of the control spring 20 determines the control pressure set by the pressure regulator in the control pressure chamber 15. The control pressure is set in a known way as described at the beginning for the known pressure regulator.

The control face 29 of the control incline 28 bears a toothing 33 consisting of a multiplicity of equidistantly arranged teeth 34. The teeth are provided in order to compensate for the unavoidable hysteresis of the pressure regulator, as can be seen in the characteristic curve of the pressure regulator illustrated in FIG. 4. The FIG. 4 hysteresis indicates the relationship between control variable G, i.e. the control pressure in the control pressure chamber 15, and the actuating path S of the actuating element, here of the manual selection wheel 27. Each tooth 34 has in two mutually perpendicular planes a sawtooth-like contour 35 and 36, respectively, each having a rising edge 37 and 38, respectively, and a falling edge 39 and 40, respectively, adjoining the rising edge in the displacement direction of the control incline 28. One tooth contour 35 lies in a plane which is perpendicular to the control face 29 and extends in the displacement direction of the control incline 28. The other tooth contour 36 lies in a plane which is at right angles thereto and which extends parallel to the control face 29 in FIG. 1 and perpendicularly to the plane of the Figure. The last-mentioned tooth contour 36 can be seen particularly clearly in the top view of a tooth 34 illustrated in FIG. 2. An illustration of the tooth design is shown in the diagrammatic view of a tooth 34 according to FIG. 3. Each tooth 35, 36 is assigned a displacement direction of the control ramp 28, the respective rising edge 37 and 38, respectively, falling away in the associated displacement direction D and C, respectively, of the control incline 28. The falling direction of the rising edge 37 of the tooth contour 35 coincides with the falling direction of the control face 29.

As can be seen from FIGS. 1-3, the tooth contour 35 has a very steep falling edge 39 and a more gently inclined rising edge 37 while the tooth contour 36 has a more gently inclined falling edge 40 and a steeper rising edge 38. The rising edge 37 of the tooth contour 35 and the falling edge 40 of the tooth contour 36 collide approximately at the base of the tooth 34 on the control face 29, as do the falling edge 39 of the one tooth contour 35 and the rising edge 38 of the other tooth contour 36 at the other base of the tooth 34. In order to ensure good guiding of the end of the control slide 23 on the tooth contours 35, 36, the edges are widened to form guide faces. Thus a leading slope 41 extends along the rising edge 37 of the tooth contour 35 perpendicular to the plane of the tooth contour 35 and a guiding face 42 and a guiding face 43 extends along the rising edge 38 and the falling edge 40 of the other tooth contour 36 at right angles to the control face 29. The guiding face 42 is delimited in the plane of the tooth contour 35 by its falling edge 39. Above the control face 29 and the toothing 33, a guide wall 44 protrudes on one side on the control incline 28, which guide wall laterally delimits the toothing 33 with its one side face. Guide wall 44, toothing 33 and control face 29 are constructed integrally on the control incline 28. The guide wall 44 provides lateral guidance to the control slide 23 when it runs up onto the leading slope 41. The control slide 23 receives the same lateral guidance by means of the guiding faces 42, 43 when it moves on the control face 29 from one base of the tooth to the other, that is to say from one final position to the other.

Figure 4:
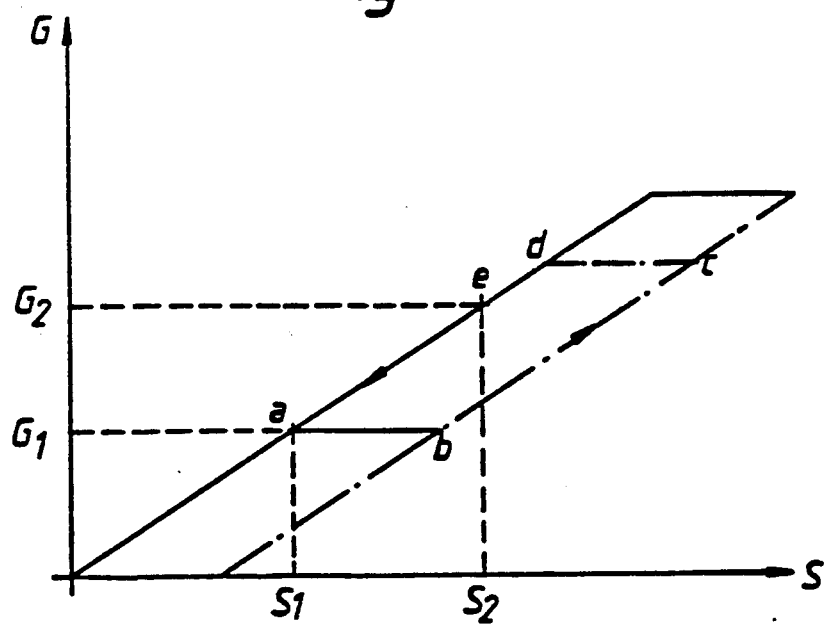
FIG. 4 is a diagram of the characteristic curve of the pressure regulator in FIG. 1.

In order to explain the mode of operation of the setting mechanism 24, it is assumed that the manual selection wheel 27 is in the initial position illustrated in FIG. 1 and that the manual selection wheel 27 is in the position $S_1$ with respect to the characteristic curve illustrated in FIG. 4. Thus the control variable $G_1$, i.e. a specific control pressure, is adjusted at the output of the pressure regulator. If it is now intended to increase the control pressure, the manual selection wheel 27 is rotated in the clockwise direction and set, for example, to the number "6", which on the characteristic curve means an adjustment path of $S_1$ to $S_2$. By means of the displacement of the control incline 28 thus brought about in the direction D (FIG. 1), the tooth 34 slides away with its tooth contour 35 under the control slide 23. The control slide 23 runs up onto the leading slope 41 and is displaced over-proportionally in the axial direction. The initial tension of the control spring 20 is increased over-proportionally. In FIG. 4, this means that the characteristic curve is operated through from points a to b and then from points b to c. At the end of the leading slope 41, the control slide 23 slides along the falling edge 39 until it rests again on the control face 29 and remains there in a final position. As a result, the super-proportional or over-proportional axial displacement of the control slide 23 and the associated initial tension of the control spring 20 are partially canceled out again. This means that the characteristic curve in FIG. 4 is operated through from point c via point d to point e. At the end of the displacement movement, the control slide 23 has thus experienced the desired displacement and a corresponding initial tension of the control spring 20, the pressure regulator adjusts the control variable G. If the control variable $G_2$ is to be further reduced, the manual selection wheel 27 is to be rotated in the counter-clockwise direction and to be set, for example, to the number "5" again. As a result, the control incline 28 is displaced in the direction C in FIG. 1. During this process, the control slide 23 slides along the guiding face 42 located on the rising edge 38 of the tooth contour 36, in which case it is deflected transversely in order then finally to slide along the guiding face 43 located on the falling edge 40 and into the locking setting located between two teeth 34 in each case. During this entire movement, the end side of the control slide 23 rests on the control face 29. During this adjustment movement, the characteristic curve in FIG. 4 traces from point e to point a and the control slide 23 is displaced proportionally. As is apparent from the preceding description, when the manual selection wheel 27 is set to the position $S_1$, the control variable $G_1$ is always adjusted by t he pressure regulator and when the manual selection wheel 27 is set to the position $S_2$, the control variable $G_2$ is always adjusted, irrespective of whether the manual selection wheel 27 has been placed in the position $S_1$ or $S_2$ by rotation to the left or right. Thus, the hysteresis affecting the pressure regulator is compensated, as before, by the adjustment mechanism 24 described above and the operator will set the respectively expected control pressure in a reproducible manner by carrying out a setting of a specific mark on the manual selection wheel.

In a modification of the described adjustment mechanism 24, the area of the control face 29 of the control incline 28 which extends along the rising face 38 of the tooth contour 36 is of plane construction and thus offset from the continuously inclined course of the rest of the control face 29. As a result, it is ensured that the control slide 23 is always returned automatically into one of the final positions between the individual teeth 34 by the spring force of the control spring 20 and remains there until the next adjustment using the manual selection wheel 27.

In addition, a lateral force component which presses the control slide 23 towards the guiding wall 44 may also engage at the free end of the control slide 23. Thus, a reliable lateral guidance of the control slide 23 is guaranteed which ensures that the control slide 23 is placed with sufficient pressing force either against the guiding wall 44 or against the guiding faces 42 and 43. Such a force component can be generated by an additional pressure spring. However, in general the centering force generated on the control slide 23 by the housing 10 and the control spring 20 is sufficient for an adequate lateral abutment of the control slide 23 against the guiding wall 44 and against the guiding faces 42 and 43.

The invention is not limited to the exemplary embodiment described. Thus, the control face of the control incline does not need to rise linearly but rather can also be of concave or convex construction in order to obtain a correspondingly modified characteristic curve of the regulator.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A regulator having a hysteresis-affected characteristic curve includes a manually operable actuating element for presetting a desired control variable, an axially displaceable control slide for adjusting the preset control variable in accordance with said control slide's axial displacement and, a control incline, having a control face, coupled to said actuating element for converting the actuating elements' adjustment movement into an axial displacement of the control slide, said control face rises in the adjustment direction of said actuating element, said control slide via a spring force rests in the axial direction, wherein a toothing bears along the control face of said control incline, said toothing includes a multiplicity of equidistantly arranged teeth which have, in each case in two mutually perpendicular planes extending in the displacement direction of the control incline, a sawtooth-like contour in each case with one rising edge for running up the control slide and a falling edge which follows in the displacement direction, the rising edge of the one tooth contour falling away in the one displacement direction of the control incline and the rising edge of the other tooth contour falling away in the other displacement direction inversely to the latter rising edge of the control incline, said falling direction of the rising edge of the tooth contour, in the plane perpendicular to the control face of the control incline, coincides with the falling direction of the control face.

2. A regulator according to claim 1, wherein said tooth contour has in the plane perpendicular to the control face a very steep falling edge and a more gradually inclined rising edge, the base of which are located in each case on the control face.

3. A regulator according to claim 2, wherein a guiding wall is arranged on the control incline, said guiding wall extends in the displacement direction of said control incline and perpendicular to the control face, protrudes above the control face and toothing and delimits the teeth on the side facing away from the tooth contour in the plane parallel to the control face.

4. A regulator according to claim 3, wherein the rising edge of the tooth contour is located in a plane parallel to the control face and has its base near the guiding wall.

5. A regulator according to claim 1, wherein a guiding wall is arranged on the control incline, said guiding wall extends in the displacement direction of said control incline and perpendicular to the control face, protrudes above the control face and toothing and delimits the teeth on the side facing away from the tooth contour in the plane parallel to the control face.

6. A regulator according to claim 5, wherein the rising edge of the tooth contour is located in a plane parallel to the control face and has its base near the guiding wall.

7. A regulator according to claim 6, wherein said control incline with control face, guiding wall and toothing are formed of an integral construction.

8. A regulator according to claim 6, wherein the rising edge of the tooth contour is constructed more steeply in the plane running parallel to the control face of the control incline than its falling edge.

9. A regulator according to claim 6, wherein a pressing force directed towards the guiding wall engages on the control slide.

10. A regulator according to claim 6, wherein the control face of the control incline has at least one of a linear, concave, and convex course.

11. A regulator according to claim 6, wherein the control slide is constructed as one support of a control spring, the other support of which is made on an axially displaceable control piston which delimits a control pressure chamber and rest, under the force of the control spring, with an inner valve seat, which divides the control pressure chamber form a pressure-relief chamber, on a valve closing element of a double-seated valve, said double-seated valve in turn interacts with a coaxial outer valve seat which divides the control pressure chamber from a supply pressure chamber and is spatially fixed, and is loaded in the closing direction of the outer valve seat by the supply pressure in the supply pressure chamber and a valve closing spring.

12. A regulator according to claim 5, wherein said control incline with control face, guiding wall and toothing are formed of an integral construction.

13. A regulator according to claim 12, wherein the rising edge of the tooth contour is constructed more steeply in the plane running parallel to the control face of the control incline than its falling edge.

14. A regulator according to claim 12, wherein a pressing force directed towards the guiding wall engages on the control slide.

15. A regulator according to claim 12, wherein the control face of the control incline has at least one of a linear, concave, and convex course.

16. A regulator according to claim 12, wherein the control slide is constructed as one support of a control spring, the other support of which is made on an axially displaceable control piston which delimits a control pressure chamber and rest, under the force of the control spring, with an inner valve seat, which divides the control pressure chamber form a pressure-relief chamber, on a valve closing element of a double-seated valve, said double-seated valve in turn interacts with a coaxial outer valve seat which divides the control pressure chamber from a supply pressure chamber and is spatially fixed, and is loaded in the closing direction of the outer valve seat by the supply pressure in the supply pressure chamber and a valve closing spring.

17. A regulator according to claim 5, wherein the rising edge of the tooth contour is constructed more steeply in the plane running parallel to the control face of the control incline than its falling edge.

18. A regulator according to claim 17, wherein an area, extending along the rising edge, of the control face is of planar construction such that it runs at right angles to the axial displacement direction of the control slide.

19. A regulator according to claim 18, wherein a pressing force directed towards the guiding wall engages on the control slide.

20. A regulator according to claim 18, wherein the control slide is constructed as one support of a control spring, the other support of which is made on an axially displaceable control piston which delimits a control pressure chamber and rest, under the force of the control spring, with an inner valve seat, which divides the control pressure chamber form a pressure-relief chamber, on a valve closing element of a double-seated valve, said double-seated valve in turn interacts with a coaxial outer valve seat which divides the control pressure chamber from a supply pressure chamber and is spatially fixed, and is loaded in the closing direction of the outer valve seat by the supply pressure in the supply pressure chamber and a valve closing spring.

21. A regulator according to claim 17, wherein a pressing force directed towards the guiding wall engages on the control slide.

22. A regulator according to claim 17, wherein the control face of the control incline has at least one of a linear, concave, and convex course.

23. A regulator according to claim 17, wherein the control slide is constructed as one support of a control spring, the other support of which is made on an axially displaceable control piston which delimits a control pressure chamber and rest, under the force of the control spring, with an inner valve seat, which divides the control pressure chamber form a pressure-relief chamber, on a valve closing element of a double-seated valve, said double-seated valve in turn interacts with a coaxial outer valve seat which divides the control pressure chamber from a supply pressure chamber and is spatially fixed, and is loaded in the closing direction of the outer valve seat by the supply pressure in the supply pressure chamber and a valve closing spring.

24. A regulator according to claim 5, wherein a pressing force directed towards the guiding wall engages on the control slide.

25. A regulator according to claim 5, wherein the control face of the control incline has at least one of a linear, concave, and convex course.

26. A regulator according to claim 5, wherein the control slide is constructed as one support of a control spring, the other support of which is made on an axially displaceable control piston which delimits a control pressure chamber and rest, under the force of the control spring, with an inner valve seat, which divides the control pressure chamber form a pressure-relief chamber, on a valve closing element of a double-seated valve, said double-seated valve in turn interacts with a coaxial outer valve seat which divides the control pressure chamber from a supply pressure chamber and is spatially fixed, and is loaded in the closing direction of the outer valve seat by the supply pressure in the supply pressure chamber and a valve closing spring.

27. A regulator according to claim 1, wherein the control face of the control incline has at least one of a linear, concave, and convex course.

28. A regulator according to claim 1, wherein the control slide is constructed as one support of a control spring, the other support of which is made on an axially displaceable control piston which delimits a control pressure chamber and rest, under the force of the control spring, with an inner valve seat, which divides the control pressure chamber form a pressure-relief chamber, on a valve closing element of a double-seated valve, said double-seated valve in turn interacts with a coaxial outer valve seat which divides the control pressure chamber from a supply pressure chamber and is spatially fixed, and is loaded in the closing direction of the outer valve seat by the supply pressure in the supply pressure chamber and a valve closing spring.

* * * * *